Aug. 27, 1940.  R. C. PRATT  2,212,718
BLIND
Filed July 5, 1935  6 Sheets-Sheet 1
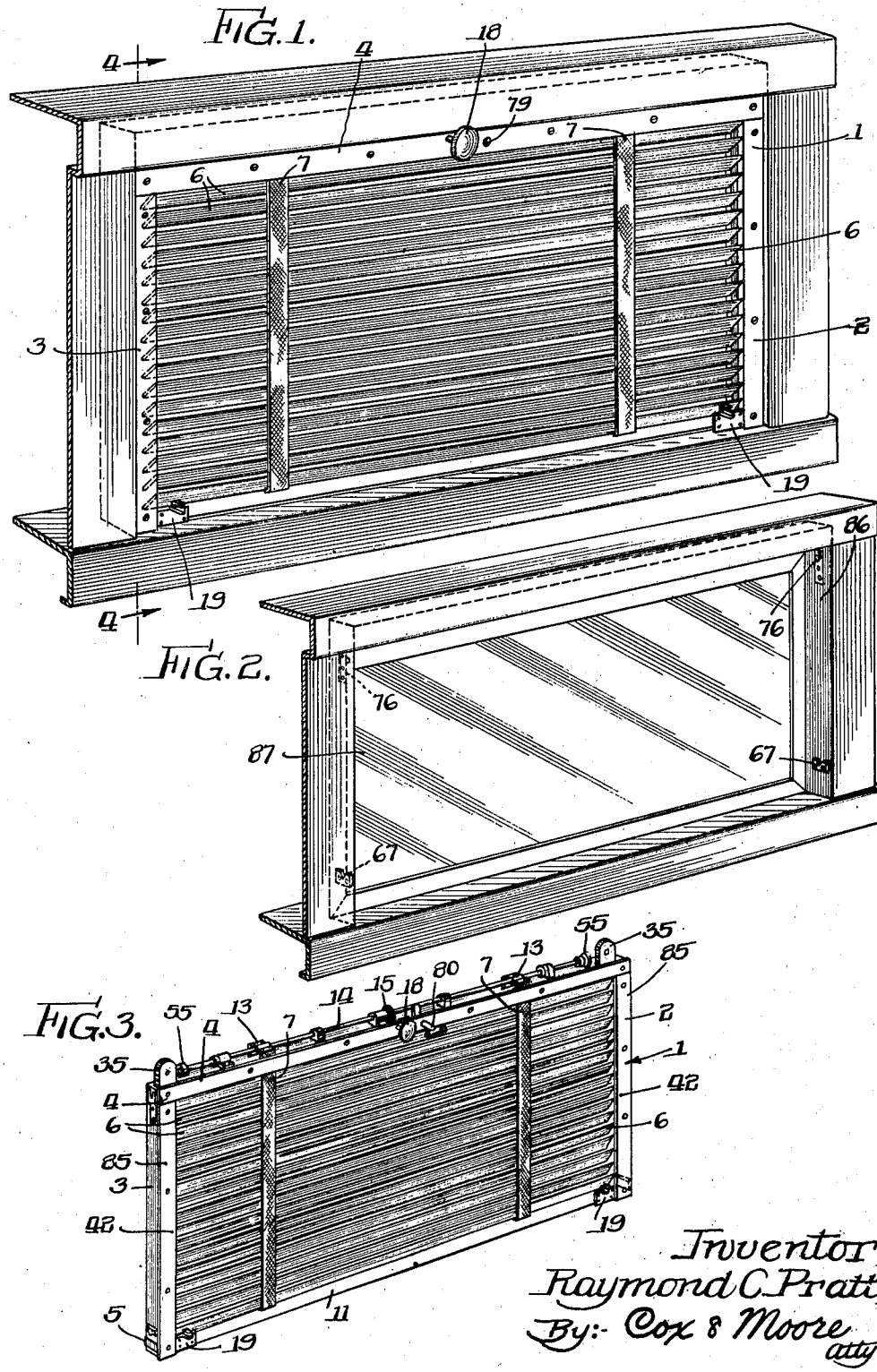
Inventor:-
Raymond C. Pratt
By:- Cox & Moore
attys.

Aug. 27, 1940.  R. C. PRATT  2,212,718
BLIND
Filed July 5, 1935  6 Sheets-Sheet 2
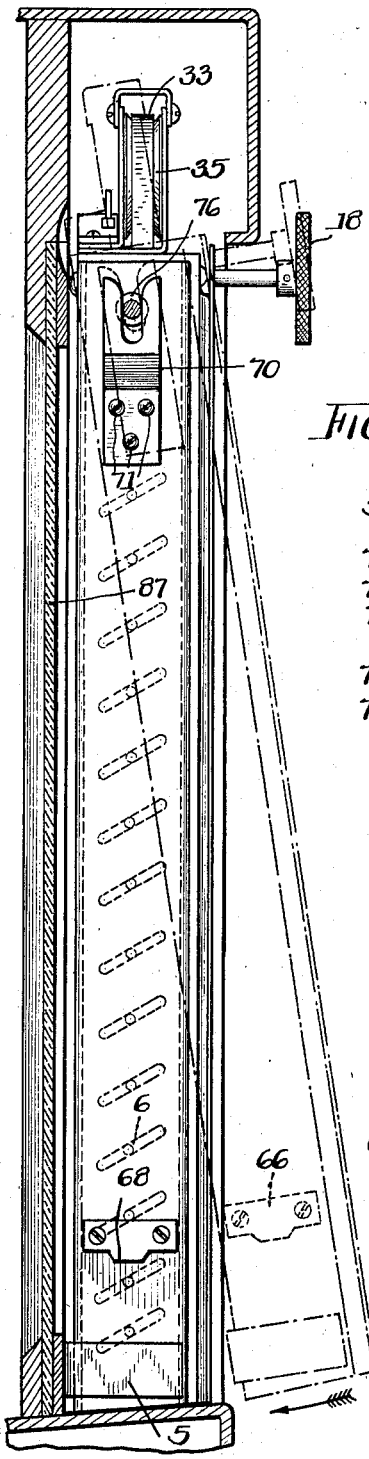
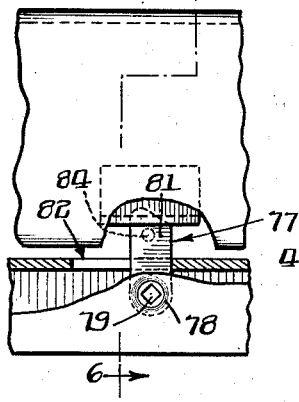
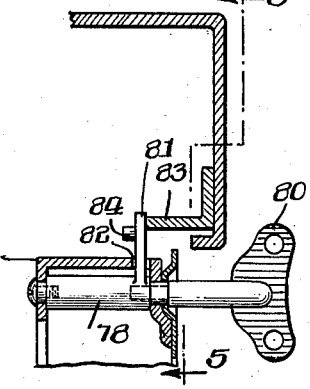
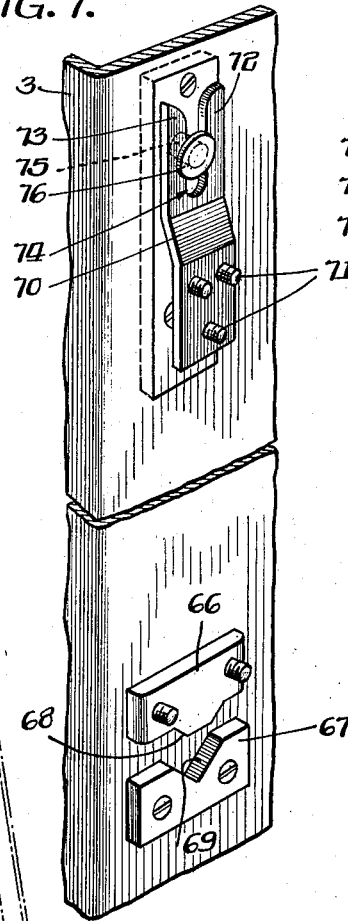
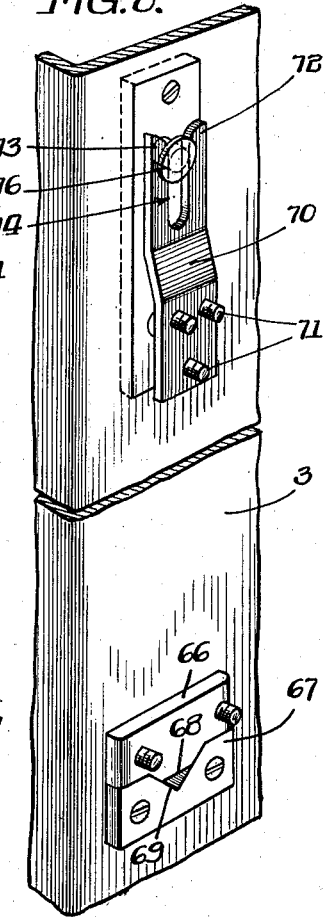
Inventor
Raymond C. Pratt
By:- Cox & Moore attys.

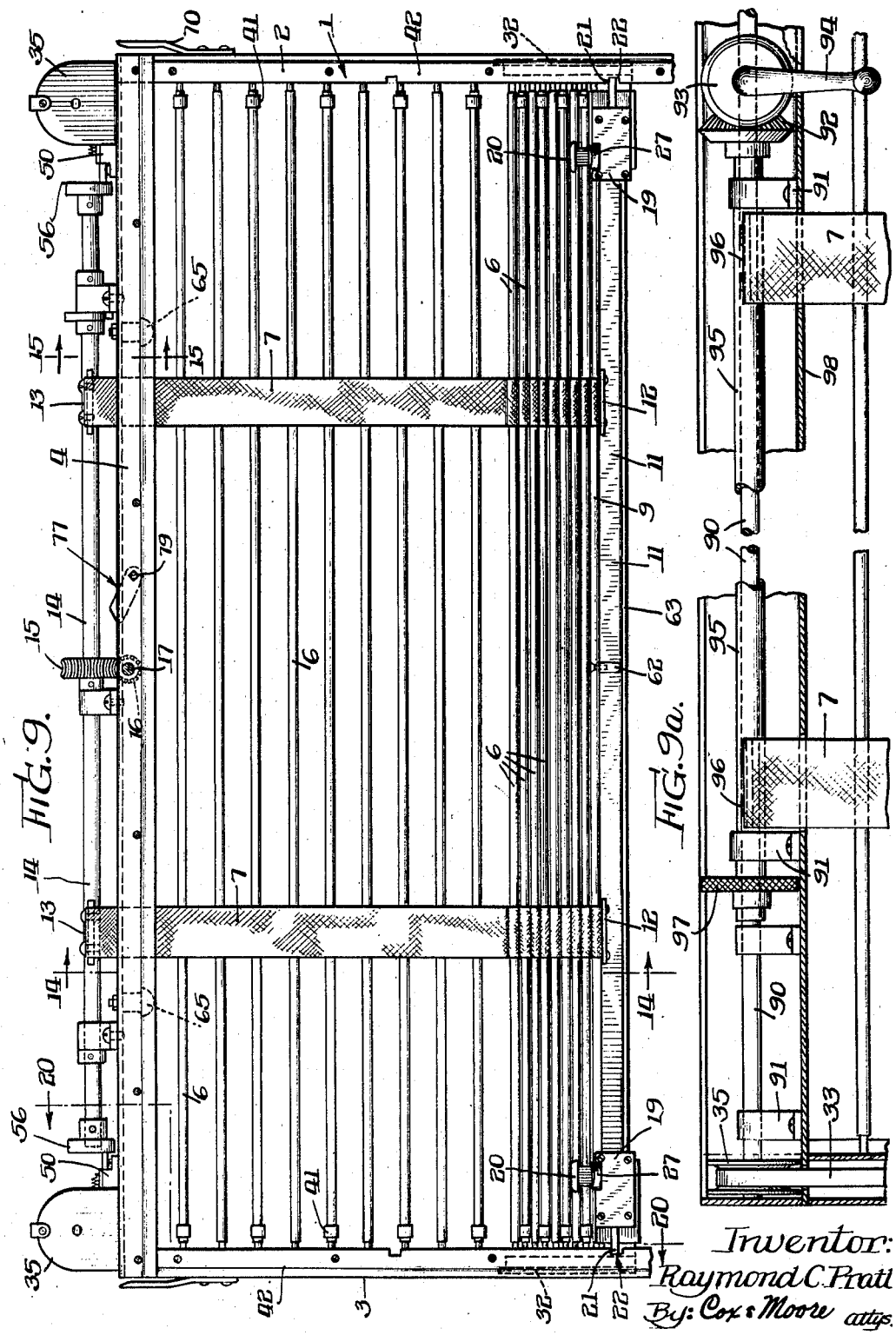

Aug. 27, 1940.    R. C. PRATT    2,212,718
BLIND
Filed July 5, 1935    6 Sheets-Sheet 4
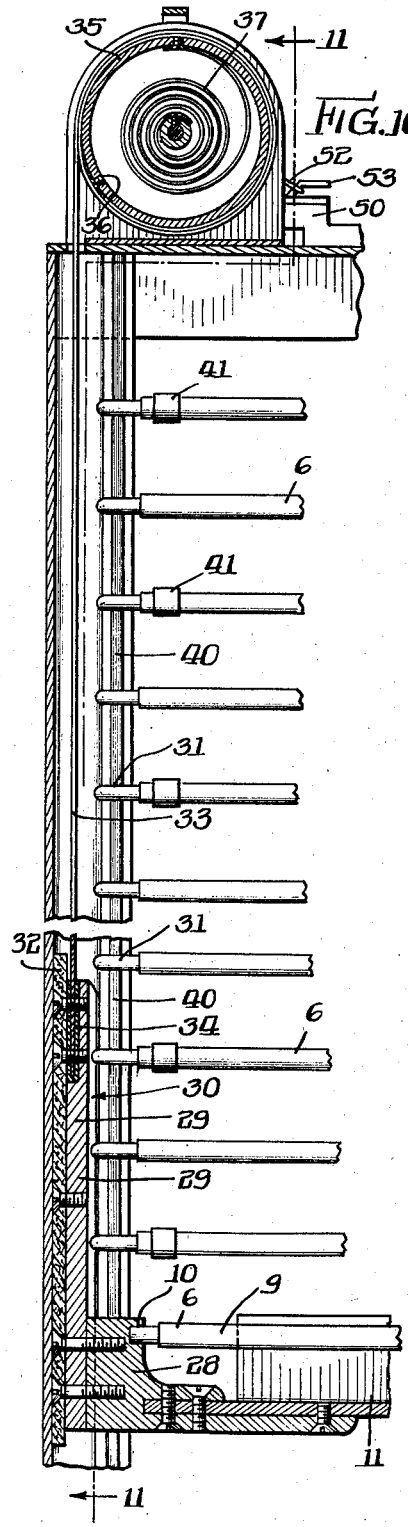
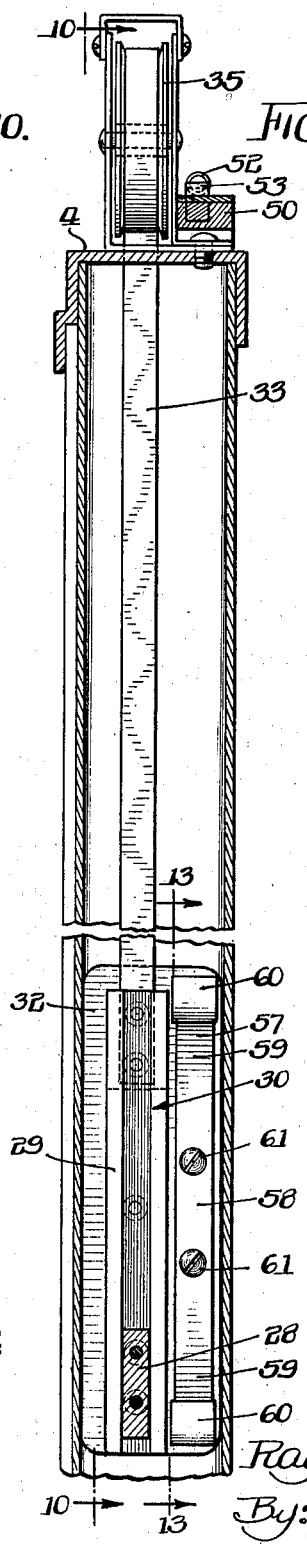
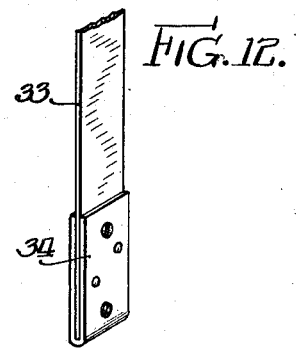
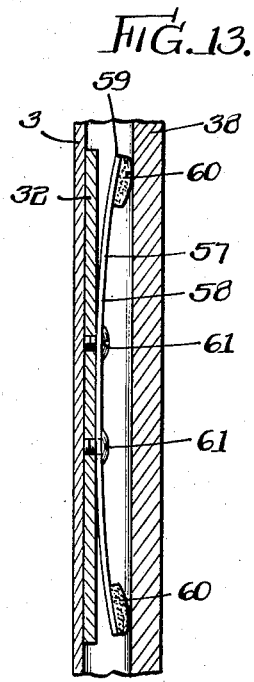
Inventor:-
Raymond C. Pratt
By:- Cox & Moore attys.

Aug. 27, 1940.　　　R. C. PRATT　　　2,212,718
BLIND
Filed July 5, 1935　　6 Sheets-Sheet 5
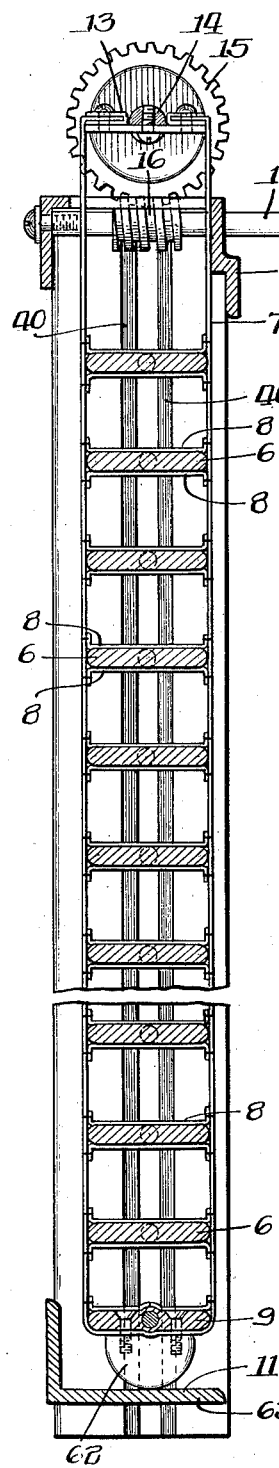
Inventor:
Raymond C. Pratt
By: Cox & Moore attys Aug. 27, 1940.   R. C. PRATT   2,212,718
BLIND
Filed July 5, 1935   6 Sheets-Sheet 6
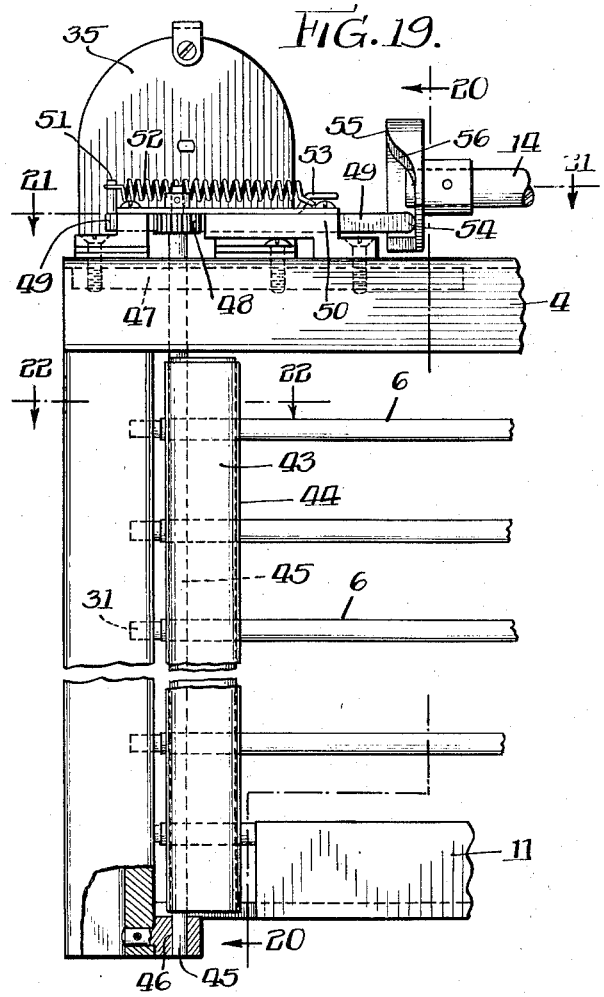
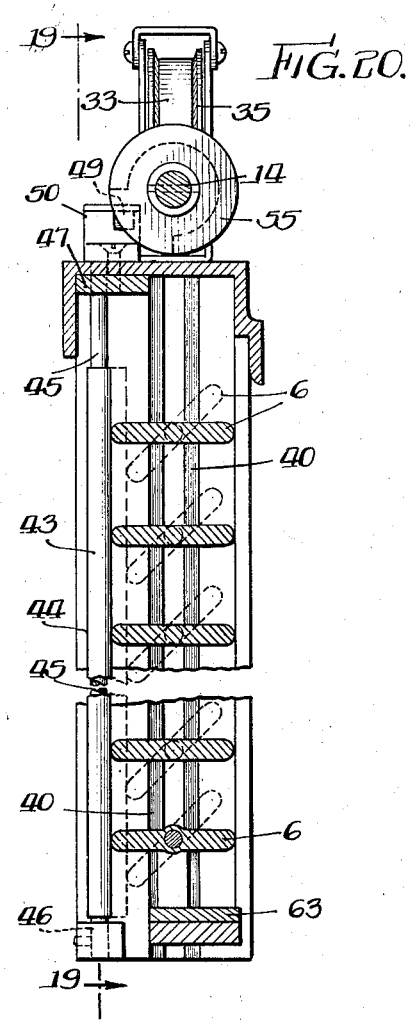
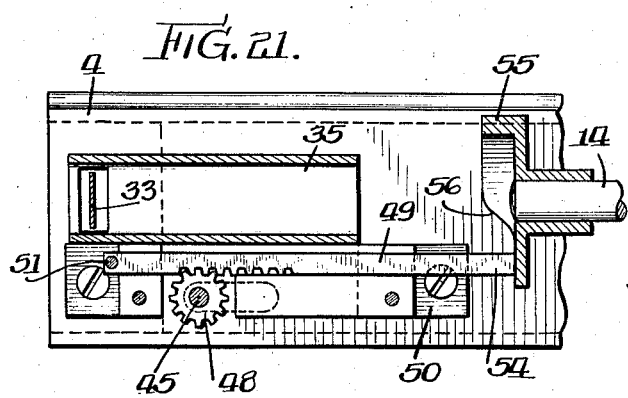
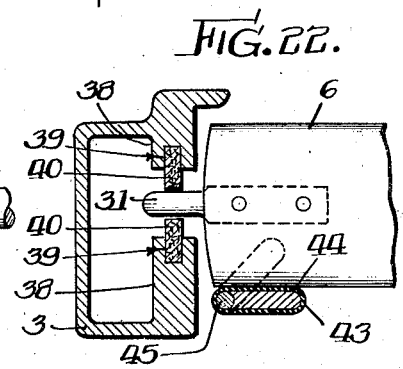
Inventor:
Raymond C. Pratt
By: Cox & Moore attys.

Patented Aug. 27, 1940

2,212,718

UNITED STATES PATENT OFFICE 2,212,718

BLIND

Raymond C. Pratt, Chicago, Ill., assignor to H. B. Dodge and Company, Chicago, Ill., a corporation of Illinois Application July 5, 1935, Serial No. 29,774

20 Claims. (Cl. 156—17)

This invention relates to a window blind or shutter made of spaced slats and is of the type usually referred to as a Venetian blind.

An important object of the invention is the provision of a blind adapted to be used in window openings of any kind but particularly adapted for use on railway cars, the entire blind being assembled as a unitary structure and operatively supported by a frame, whereby the frame and the operating parts and components of the blind may be installed and removed from a window opening as a single unitary structure.

Another important object of the invention is to provide a blind composed of spaced apart slats operatively supported in a frame and provided with means for counter-balancing the weight of the slats, for controlling the positioning of the slats, that is, the tilting of the slats, for preventing rattling of the slats and for locking the unitary frame within the window opening.

Other important objects of the invention are the provision of a blind which is lifted manually by operating handles on the bottom bar, which is provided with latch mechanism for locking the blind in various positions throughout its height, which is provided with coiled flat springs to counter-balance the weight of the blind, which is provided with sound deadening and anti-rattling means so as to permit noiseless operation of the blind and prevent rattling due to jars and vibration inherent in railroad travel, which is provided with improved means for tilting and positioning of the slats, and which is provided with means engaging the slats to prevent the rattling thereof, said means being controlled by the means which tilt the slats whereby the anti-rattling member will be in constant engagement with the slats regardless of their tilted position.

A still further object of the invention resides in the specific and particular arrangement and construction of the parts, the manner in which they are controlled and operated, and the various elements and devices as well as the interfitting and locking arrangement necessary to complete and assure the proper operation of the blind.

Numerous other objects and advantages will appear throughout the progress of the following specification.

The accompanying drawings illustrate a selected embodiment of the invention and the views therein are as follows:

Fig. 1 is a detail elevational view of a window opening and having the improved blind operatively installed therein.

Fig. 2 is a detail elevational view of the window opening, the blind being removed therefrom.

Fig. 3 is a detail perspective view of the improved blind constructed and arranged so that the same may be inserted bodily as a unitary structure in place in a window opening.

Fig. 4 is a detail longitudinal sectional view on the line 4—4 of Fig. 1.

Fig. 5 is a detail elevational view partly in section, showing the means for locking the blind as a unit in position in a window opening, the view being taken on the line 5—5 of Fig. 6.

Fig. 6 is a detail sectional view on the line 6—6 of Fig. 5.

Fig. 7 is a detail view showing the manner in which the blind is positioned in the opening to bring the engaging means into interfitting relationship when the blind is being positioned in the opening.

Fig. 8 is a similar view showing the parts in interfitted or interlocked relationship when the blind is installed within the opening.

Fig. 9 is a detail front elevation of the improved blind and its co-operating mechanism arranged in a rigid supporting frame whereby a single unit is provided.

Fig. 9a is a detail elevational view showing a modified form of operating structure which may be preferred.

Fig. 10 is a detail vertical sectional view taken along the line 10—10 of Fig. 11.

Fig. 11 is a detail sectional view taken along the line 11—11 of Fig. 10.

Fig. 12 is a detail perspective view of the flat steel band which is connected to the spring housing and to the blind.

Fig. 13 is a detail sectional view on the line 13—13 of Fig. 11.

Fig. 14 is a vertical sectional view on the line 14—14 of Fig. 9.

Fig. 15 is a detail sectional view on the line 15—15 of Fig. 9.

Fig. 16 is a detail elevational view partly in section, on the line 16—16 of Fig. 17.

Fig. 17 is a detail transverse sectional view on the line 17—17 of Fig. 16.

Fig. 18 is a detail sectional view on the line 18—18 of Fig. 16.

Fig. 19 is a rear elevational view, parts being broken away for the sake of clearness, and taken on the line 19—19 of Fig. 20.

Fig. 20 is a detail vertical sectional view taken on the lines 20—20 of Figs. 9 and 19.

Fig. 21 is a detail sectional view on the line 21—21 of Fig. 19.

Fig. 22 is a detail transverse sectional view on the line 22—22 of Fig. 19.

The particular blind herein shown for the purpose of illustrating the invention comprises a rigid frame 1 which includes spaced side members forming supports and grooves 2 and 3, a head 4 rigidly connected to the top of the members 2 and 3, and a bottom or rear connecting strap 5 which holds the parts in proper position, more clearly shown in Figs. 3 and 9. A plurality of spaced apart slats 6 are suspended on spaced slat supports or tapes 7 and are maintained in proper spaced relationship by means of the cross webs or ladders 8 which extend above and below the slats 6, as clearly shown in Fig. 14. The lowermost of the slats 6 designated by the numeral 9, Fig. 10, is pivotally connected at 10 to the bottom bar 11. The bottom end of each of the supports or tapes 7 is rigidly connected to the bottom slat 9, as indicated at 12, Fig. 9. The upper end of each of the tapes or slat supports 7 is rigidly connected at 13 to a rod or shaft 14, Figs. 3 and 9, which extends substantially across the entire width of the frame 1. A worm gear 15, Fig. 9, meshes with a worm 16 and this worm has an extension 17 extending through an opening in the front of the top head 4 and carries a knurled hand wheel 18 for operating the worm 16. Thus, when the hand wheel 18 is rotated the worm 16 will rotate and cause rotation of the gear 15. As the gear 15 and the tapes 7 are rigidly connected to the shaft or bar 14 by means of the connection 13, one side of the tapes will be caused to be lowered and the other side will be caused to be raised, thus shifting the angular positioning of the slats in any desired tilted position.

The blind is raised manually, that is, by lifting up on the bottom bar 11, there being a latch element 19, Fig. 16, on each side of the bottom bar to hold the blind in any desired vertical position.

Each latch element 19 comprises a thumb piece 20 for operating a latch or bar 21 which is adapted to be received in spaced notches or keepers 22 formed in a part of the grooves 2 and 3. A compressed spring 23, Fig. 16, is rigidly connected to the shiftable bar or latch member 21, as indicated at 24, Fig. 16, and to a rigid part of the bottom bar and urges the latch or bar 21 outwardly toward the respective grooves. This bolt or latch is provided with a projection 25 which is operated by a cam 26 formed on the thumb piece 20. Thus, when the thumb piece 20 is pressed downwardly, Fig. 16, the latch or bar 21 will be moved to the right, Fig. 16, and cause the bolt 21 to be freed from the notch or keeper 22, at which time the blind is free to be manually raised, it being understood, of course, that both latches must be released before the blind can be properly raised or lowered. A rigid lifting element 27 is rigidly connected to the bottom bar 11 and is positioned immediately below the thumb piece 20 whereby the blind may be lifted, the bolts or latches 21 being freed from their respective keepers 22 by squeezing the members 20 and 27 together. As the member 27 is rigid the member 20 will then be pushed inwardly and cause retraction of each respective bolt from its respective keeper 22, Fig. 9.

The bottom bar 11 has a rigid extension 28 affixed thereto which is rigidly connected to a vertical piece 29. As the construction on each side of the blind is exactly the same, only one side, therefore, need be described. This vertical piece 29 is provided with a groove 30 into which the end of the member 28 extends, as well as the reduced ends 31 of the slats 6, Figs. 10, 17 and 22. A fiber piece 32 is fixed to the vertical member 29 and comprises a sled which is adapted to run freely in the groove or side member 3.

A flat metal tape 33, Fig. 10, has its lower end fixed to the member 29 and the sled 32, as indicated at 34, Fig. 10, and its upper end operatively connected to a roller or wheel 35, as indicated at 36, Fig. 10. This wheel or roller 35 has a coiled spring 37 to urge the wheel in a clockwise direction as shown in Fig. 10, and thereby to create a lifting tension on the bottom bar 11. This lifting tension caused by the spring urged roller which is mounted on each side of the frame and connected to a respective tape, as clearly shown in Fig. 9, tends to counter-balance the weight of the slats and bottom bar.

The side members 2 and 3 each include the inward extensions 38, Fig. 17, which are grooved at 39. Filler blocks 40 made of fiber or rubber or other sound deadening material are arranged in the grooves 39 and extend outwardly a predetermined distance substantially to the side edges of the member 28 and the side edges of the ends 31 of the slats. Thus, the inward and outward movement of the blind is restricted and any movement of the blind is limited and should the blind, or rather any of the slats thereof, move in a forward or outward direction, no noise will result because of these filler blocks which, being made of sound deadening material, will absorb the jar or vibration and prevent noise. These filler blocks form guiding grooves into which the ends 31 of the slats extend and, therefore, also guide the slats. These sound deadening filler blocks 40 extend from the extreme bottoms of the side members 2 and 3 up to the top head member 4.

Also, to overcome vibration and rattling, the slats 6 may have rubber surfaces 41 arranged at their ends, Fig. 9, so that during movement caused by vibration, and should the slats 6 come in contact with the side edges 42 of the side members 2 and 3, no noise will result because of the rubber or other sound deadening material which is provided at the ends of the slats. This sound deadening material 41 also acts on vertical strips 43, Fig. 22, which are covered with rubber or other sound deadening material 44. These strips 43 are arranged on the rear side of the blind and are mounted on each side, being supported on vertical shafts 45 which are pivoted at 46 to the lower end of the frame and at 47, Fig. 19, to the upper side of the frame.

Each of the shafts 45 extends through the top of the top head 4 and carries a pinion wheel 48, Figs. 19 and 21. Each pinion wheel 48 meshes with a toothed rack 49 slidably arranged in a supporting housing 50 formed on the top of the top head 4. The outer end of the rack 49 extends through the housing 50 and carries an upstanding pin 51, and a spring 52 affixed to the pin 51, Fig. 19, and to a rigid part 53 of the housing 50, tends to urge the cam end 54 of the said rack 49 against a cam wheel 55 and in constant engagement therewith. There is a cam wheel 55 arranged on each side of the blind to co-operate with a respective rack 49. Each cam wheel 55 is rigidly fastened to the bar or shaft 14 and has cam surfaces 56 against which the end 54 of each rack 49 engages. Rotation of a cam 55, therefore, will cause each rack 49 to be moved inwardly and outwardly, the high part of the cam forcing the rack in an outward direction while the spring 52 will force the rack inwardly toward the low part of the cam. Rotation, therefore, of the hand wheel 18 will thus cause rotative movement of the shaft 14, as previously described. Rotation of the shaft 14, therefore, causes rotation of each cam 55 and each cam co-operates with a rack bar 54 causing the rack bar 54 to be moved inwardly and outwardly. This inward and outward movement of a rack bar causes rotation of a co-operating pinion 46, and as the pinion 48 is fixed to the shaft 45 the shaft 45 will rotate. Consequently, as the strip 43 is fixed to the shaft, the strip will be caused to pivot on its shaft 45. Thus, when the hand wheel 18 is rotated to tilt the position of the slats 6 the strips 43 will likewise be caused to be shifted on their pivots; and inasmuch as the movement of the strips 43 is correlated with respect to the tilting movement of the slats, the strips 43 will be in constant engagement with the edges of the slats. Normally, when the slats are in straight horizontal planes the strips 43 will engage the outer edges of the slats, as clearly shown in full lines in Fig. 22. When, however, the hand wheel 18 is operated to tilt the slats, the strips 43 will be caused to move inwardly, as shown in dotted lines in Fig. 22, and still engage the outer edges of the slats. The slats are, therefore, prevented from shifting and if, through wear or loose fitting or otherwise, there should be a small amount of space between the slats 6 and the strips 43, no noise will result because the strips 43 are covered with sound deadening material such as rubber or rubber composition.

To keep the bottom bar parallel with the sill and to prevent jamming, sticking and canting of the blind and particularly the bottom bar, a friction element or member 57 is provided, Figs. 11, 13 and 17. This friction element 57 comprises a bowed spring 58 having outwardly extending ends 59 to which there are fastened fiber or other sound deadening knobs 60. The bowed spring is fixed to the fiber sled 32, Fig. 17, as indicated at 61, and the fiber knobs 60 engage the inwardly extending projections 38 formed on the side members 2 and 3. The members 57 are arranged to the rear of the members 29 on the bottom bar and on each end of the blind and create a tension inwardly from each of the side members 2 and 3 and prevent rattling. These members are yieldable and will permit slight movement longitudinally of the bottom bar but will overcome sliding to any extent and rattling and at the same time, due to the flexibility of the springs 58, permit the blind to be slid vertically in their grooves.

In a blind of certain width, where only two tapes are used, and because the bottom slat 9 is not fixed to the bottom bar 11 at the center thereof, it is very probable that the slats during the raising movement of the blind would bow in the center. To overcome the bowing of the slats, particularly as they pile up, a round knob or projection 62 is formed on the bottom slat 9 and engages the leg 63 on the bottom bar 11, as clearly shown in Fig. 14. Due to the substantially semicylindrical shape of the member 62 the slats are free to tilt because the bottom of the member 62 rides freely over the leg 63 of the bottom bar 11, Fig. 14, and as the bottom bar 11 is relatively rigid the bottom of the slats as they pile up during movement of the blind will be maintained in relatively straight horizontal position and be prevented from bowing in the center.

A rubber pad 64 or other engaging element or bumper is provided on the bottom bar, Fig. 18, so that when the blind is removed to lowermost position the window sill will not become scarred. Also, these rubber bumpers provided on each end of the bottom bar 11 prevent undue noise and shock when the blind is lowered.

Top limit stops, Fig. 15, comprising downwardly extending rubber knobs 65 are fixed to the underside of the top member 4 and engage the top member when the blind is lifted and the slats are piled on the bottom bar. These knobs 65 extend downwardly a predetermined distance so as to prevent the slats from coming in engagement with the worm 16 or the locking mechanism.

The entire blind and operating structure, as previously mentioned, is operatively arranged within the frame 1 and with the frame comprises a unitary structure which is adapted to be inserted into the window opening and free to be removed from the opening at pleasure. To hold the blind, including its supporting framework, in position within the window opening, interfitting or inter-engaging means on the blind frame and the window frame are provided. These interengaging means comprise a lug 66, Fig. 7, formed on each of the members 2 and 3 near the lower end thereof, which are adapted to seat themselves in seats 67. Each lug 66 is provided with a projection 68, Figs. 7 and 8, which is adapted to be seated in a V-shaped notch 69. On each side of the blind frame near the upper end of the members 2 and 3 there is provided a fastening member 70 which is fixed to the side members 2 and 3 of the frame 1, as indicated at 71. These members 70 are offset a predetermined distance, as clearly shown in Figs. 7 and 8, and have their ends 72 bifurcated, as indicated at 73, to provide receiving notches 74. These notches are adapted to receive outstanding projections 75 formed on the side jams of the window, there being a button 76 formed on the end of each projection 75. Thus, when it is desired to insert a blind in a window opening, the blind is first tilted to the position shown in Fig. 4 at which time the prongs 75 will be received in the slots 74. Then the framework is pushed upwardly until the bottom of the frame frees the window sill, at which time the parts will be in the position shown in Fig. 7. The frame 1 is therefore permitted to drop downwardly because of its own weight until the parts are seated and nested, as clearly shown in Fig. 8, at which time the framework 1 will be securely held in position in the window opening.

To maintain the frame 1 in locked position within the window opening and to prevent unauthorized removal of the blind, locking means 77, Figs. 5 and 6, are provided. The locking means comprises a revolvably mounted member 78 mounted between the legs of the substantially channel shaped top bar 4. This member 78 is provided with a square opening 79 in its front face so that it may be operated by a key 80 from the outside of the frame 1. The rotatable member 78 is provided with an upstanding lug or extension 81. This lug or extension 81 extends through a slot 82 formed in the top bar 4 and is adapted, when turned upwardly in the position shown in Figs. 5 and 6, to engage the inside edge of the head jam 83 of the window. Thus, when the locking mechanism is in the position shown in Figs. 5 and 6, the frame 1 and its associated blind is securely locked in place and can not be removed from the window opening. Thus, when the key is removed from its socket or keeper, it is impossible to remove the frame. The car attendants and porters are provided with a key so that the frame can be removed from the window opening should the occasion arise. A stop pin 84 is formed on the projection or lug 81 so as to limit the revolvable movement of the member 78 as well as the lugs 81. Ornamental strips, such as aluminum, Monel metal, etc., may be secured to the outer surfaces of the frame 1, as indicated generally by the numeral 85.

The invention provides a one-piece, unitary, self-sustaining and supporting Venetian blind which may be inserted and removed from a window frame 86. It is preferably arranged inside of the glass sash 87. The Venetian blind is adapted to be readily and quickly inserted in position and then locked to prevent removal. Parts are constructed and arranged to facilitate the quick and ready operation of the blind, and the construction throughout is durable and so formed that rattling and noise will be eliminated. The invention is particularly adaptable for railroad cars, street cars and buses, but it is understood that it may be used for any window or opening desired to perform the function for which it is intended.

A very convenient construction for both causing the blind to lift and to cause the tilting of the slats is shown in Fig. 9a. In this construction a rod 90 is revolubly supported in suitable bearings 91 attached to the top of the frame. This rod has the spring rollers or wheels 35 fixed thereto and extends from one end of the frame to the other. A bevel gear 92 is fixed to the rod 90 and meshes with another bevel gear 93 which is operated by a hand crank 94. Thus, the spring tension of the members 35 is equalized or balanced by the shaft or rod 90 and, as previously mentioned, these members 35 carrying the slat tapes 33 counterbalance the weight of the blind, including the bottom bar and the slats. Thus, when the hand crank 94 is rotated, the shaft or bar 90 will rotate and cause the tape 33 to become wound on the drums 35. Therefore, it may be said that rotation of the crank wheel 94 causes the blind to be raised or lowered at will, while the balance drums 35 counterbalance the weight of the blind, making easy and ready operation. A hollow rod 95 encircles the bar or shaft 90 and is likewise supported in bearings 91. This hollow rod has the slat tapes 7 fixed thereto, as indicated at 96, whereby the blinds may be tilted upon rotation of the outer tube or rod 95. A tilting disk 97 is fixed to the outer tube or rod 95 to permit rotation of the tube 95 and consequent tilting of the slats. A housing 98 is formed about the above described mechanism, there being a slot to permit the tilting disk 97 to extend through the housing to permit operation of the tube 95 to permit tilting of the slats. Likewise, a suitable opening is provided to permit operation of the crank 94.

In the present embodiment herein shown the slats are made of metal, or at least covered with metal, and the tapes are shown as being made of fabric. However, in actual practice other blinds having a metal tape have been used with success and advantage. The blind when in place permits the light rays to be diffused or shut out at the will of the passenger, and at night the blind provides a safety measure for the passenger as flying glass and debris are prevented from falling into the berth in the case of accident by broken window or otherwise.

Venetian blinds of the type herein set forth are very practical in connection with railway and Pullman cars, particularly in cars where air conditioning is employed.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A blind comprising spaced slats, means for tilting the slats, a vertical member engaging the slats to prevent rattling thereof, means for operating the vertical member, and a single operable means for operating both of said means.

2. A blind comprising spaced slats, means for tilting the slats, a vertical member engaging the slats to prevent rattling thereof, means for operating the vertical member, and means for operating both of said means simultaneously.

3. A blind comprising a frame, a revoluble member mounted on the frame, tapes connected to the member, slats carried by the tapes, means to rotate the revoluble member to operate the tapes to tilt the slats, a pivoted member engaging the slats to prevent rattling thereof, and means to operate the pivoted member in synchronism with the tilting movement of the slats.

4. A blind comprising a frame, a revoluble member mounted on the frame, tapes connected to the member, slats carried by the tapes, means to rotate the revoluble member to operate the tapes to tilt the slats, and a pivoted member engaging the slats to prevent rattling thereof, said pivoted member being operated by the last named means and in timed relationship with the tilting movement of the slats.

5. A blind comprising spaced grooves, slats for said blind and operable in the grooves, and a yieldable element arranged in the back of a groove to prevent jamming, sticking and canting of the slats in the grooves.

6. A blind comprising a bottom bar and a plurality of spaced slats, means for raising the bottom bar and supporting the slats, and a member engaging the bottom bar at the center to prevent sagging of the slats when the bottom bar is lifted.

7. A blind comprising superposed slats, means for tilting the slats, and a vertical pivoted member constantly engaging the slats to prevent rattling thereof.

8. A blind comprising superposed slats, means for tilting the slats, a vertical pivoted member constantly engaging the slats to prevent rattling thereof, a pinion on the pivoted member, a rack operating the pinion, a rotatable cam, and a spring for urging the rack against the cam, rotation of the cam moving the rack and consequently rotating the pinion to move the pivoted member on its pivot.

9. In a Venetian blind adapted to be mounted within a window casing, the combination of a single unitary blind and frame adapted to be removably mounted within said window casing, said blind being carried by said frame, yoke means rigidly mounted on the frame, pin means rigidly mounted on the casing and adapted to slidingly engage said yoke means, keeper means arranged on the frame, and detent means arranged on the casing, said detent means being complementally shaped, said detent means being also adapted to slidingly engage the keeper means and to be held in such engagement by the weight of the blind.

10. In a Venetian blind adapted to be mounted within a window casing, the combination of a frame, a blind carried by said frame, means for removably mounting said frame in said window casing and means for fastening said frame in said casing.

11. In a Venetian blind, the combination of a frame having an upper horizontal frame member and opposed vertical frame members, a shaft journaled in said horizontal frame member, said vertical frame members having guide channels, a plurality of slats having projections extending into said channels and means extending through the vertical frame members and connecting the shaft to the bottom slat to raise and lower the slats upon rotation of said shaft, a sleeve loosely journaled on said shaft and on said horizontal frame member, means passing through the horizontal frame member and connecting each of the slats to said sleeve for tilting the slats upon the oscillation of said sleeve and selectively operable means for oscillating said sleeve and rotating said shaft.

12. A blind comprising spaced slats, a bottom bar manually liftable, coiled springs above and at the opposite sides of the blind, and means including flexible connectors extending from the springs along the sides of the blind and connected to said manually liftable bottom bar at the opposite ends thereof to counterbalance the weight of the blind as the slats are superposed one upon another in the raising of the blind.

13. A blind comprising spaced slats, a bottom bar manually liftable, coiled springs at the sides of the blind, means including flexible connectors extending from the springs along the sides of the blind and connected to the manually liftable bottom bar at the opposite ends thereof to counterbalance the weight of the blind as the slats are superposed one upon another in raising the blind, and manually operable latching means carried by the bottom bar to latch the blind in various adjusted vertical positions.

14. A blind having coiled springs at each side thereof, a member housing each spring and operated thereby, a manually liftable bottom bar, and flexible members extending along the sides of the blind and connecting the housing members to the opposite sides of the manually liftable bottom bar to counterbalance the weight of the blind as the blind is raised by lifting of the bottom bar.

15. A blind comprising a frame having grooves in its side members and adapted to be inserted between window jambs, a rotatable elongated bar mounted at the opposite sides of the frame, slats having guiding engagement with said grooves, means connecting each of said slats to said longitudinal bar for tilting said slats in response to the rotation of the bar, a vertically liftable manually operable bottom bar for raising the slats and superposing the slats one upon another as the bar is lifted, a member interposed between the bottom bar and the lowermost slat to prevent the slats from sagging when the blind is lifted by operation of the bottom bar, a worm operable from the front of the frame and operatively connected to said elongated bar for rotating said elongated bar, a cam on the bar and rotatable with this elongated bar, a rack engageable with the cam, a spring for urging the rack against the cam, a pinion in engagement with the rack, a rotatably mounted vertical shaft to which the pinion is fastened, and a vertical strip operatively connected to said vertical shaft for rotation therewith and engageable with said slats in their various tilted positions.

16. In a Venetian blind adapted to be mounted within a window casing, the combination of a frame having opposed, channel-shaped side frame members and a top frame member extending between said side members, slats forming a blind suspended from said top frame member and guided in said channel-shaped side members, operating mechanism carried on said top frame member, lifting connections extending from said operating mechanism through said channel-shaped side frame members to the lowermost slat and operatively connected to the opposite ends of said lowermost slat, and means for removably mounting said frame in said window casing.

17. In a Venetian blind adapted to be mounted within a window casing, the combination of a frame having opposed-channel-shaped side frame members and a top frame member extending between said side members, slats forming a blind suspended from said top frame member and guided in said channel-shaped side members, operating mechanism carried on said top frame member, lifting connections extending from said operating mechanism through said channel-shaped side frame members to the lowermost slat and operatively connected to the opposite ends of said lowermost slat, and interengaging means carried by said channel-shaped side members and said window casing for removably mounting said frame and blind within said casing.

18. In a Venetian blind adapted to be mounted within a window casing, the combination of a frame having opposed, channel-shaped side frame members and a top frame member extending between said side members, slats forming a blind suspended from said top frame member and guided in said channel-shaped side members, operating mechanism carried on said top frame member, lifting connections extending from said operating mechanism through said channel-shaped side frame members to the lowermost slat and operatively connected to the opposite ends of said lowermost slat, said operating mechanism including means for tilting the slats, said means for tilting the slats comprising tapes extending through openings in the top frame member and operatively connected to each of said slats, and means for removably mounting said frame in said window casing.

19. In a Venetian blind adapted to be mounted within a window casing, the combination of a frame having opposed, channel-shaped side frame members and a top frame member extending between said side members, slats forming a blind suspended from said top frame member and guided in said channel-shaped side members, operating mechanism carried on said top frame member, said operating mechanism including spring means mounted upon said top frame member, flexible members extending from said spring means along the sides of the blind and connected to the lowermost slat to counterbalance the weight of the slats as they are superposed one upon another due to the manual raising of the lowermost slat, and means for mounting said frame in said window casing.

20. A blind comprising a bottom bar and a plurality of spaced slats, means for raising the bottom bar and supporting the slats, and a member interposed between the bottom bar and the lowermost slat and engageable with said bar and said lowermost slat to prevent sagging of the slats as the bottom bar is raised to raise the slats.

RAYMOND C. PRATT.